US009537581B2

(12) United States Patent
Mills et al.

(10) Patent No.: US 9,537,581 B2
(45) Date of Patent: Jan. 3, 2017

(54) ISOLATOR INCLUDING BI-DIRECTIONAL REGULATOR

(71) Applicant: Silicon Laboratories Inc., Austin, TX (US)

(72) Inventors: Michael J. Mills, Austin, TX (US); Anantha Nag Nemmani, Austin, TX (US); Jeffrey L. Sonntag, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 244 days.

(21) Appl. No.: 14/319,601

(22) Filed: Jun. 30, 2014

(65) Prior Publication Data

US 2015/0381042 A1    Dec. 31, 2015

(51) Int. Cl.
*H02M 3/158* (2006.01)
*H04B 10/80* (2013.01)

(52) U.S. Cl.
CPC .................................. *H04B 10/802* (2013.01)

(58) Field of Classification Search
CPC ....... H02M 3/158; H04B 10/00; H04B 10/802
See application file for complete search history.

(56) References Cited

U.S. PATENT DOCUMENTS

| 6,081,437 | A * | 6/2000 | Chen ....................... H02J 1/108 363/65 |
| 8,169,108 | B2 | 5/2012 | Dupuis et al. |
| 8,451,032 | B2 | 5/2013 | Dong et al. |
| 2005/0269657 | A1* | 12/2005 | Dupuis ................... H01L 23/66 257/446 |
| 2005/0271148 | A1* | 12/2005 | Dupuis ................... H01L 23/48 375/258 |
| 2008/0063406 | A1* | 3/2008 | Kazama ............... H04B 10/802 398/140 |
| 2008/0191685 | A1* | 8/2008 | Dhuyvetter .............. H03K 7/08 324/118 |
| 2008/0315925 | A1* | 12/2008 | Alfano ................. H03K 17/691 327/103 |

OTHER PUBLICATIONS

U.S. Appl. No. 12/129,039, filed May 29, 2008, entitled "Isolator Circuit Including a Voltage Regulator," naming Donald E. Alfano, et al. as inventors.
Provisional U.S. Appl. No. 60/946,064, filed Jun. 25, 2007, entitled "Isolator Circuit Including a Voltage Regulator," naming Donald E. Alfano, et al. as inventors.

* cited by examiner

*Primary Examiner* — Jue Zhang
(74) *Attorney, Agent, or Firm* — Zagorin Cave LLP (57) ABSTRACT

An apparatus includes a first terminal, a second terminal, a bi-directional regulator circuit, and functional circuitry. The bi-directional regulator circuit generates a voltage across a first power supply node and a second power supply node in response to an input current flowing through the first terminal and the second terminal with a first polarity. The bi-directional regulator circuit also generates the voltage across the first power supply node and the second power supply node in response to the input current flowing through the first terminal and the second terminal with a second polarity opposite the first polarity. The functional circuitry is powered by the voltage and is configured to generate a signal using the voltage. The signal is indicative of the input current in response to the input current being supplied to the first terminal and is indicative of the input current in response to presence of the input current.

21 Claims, 8 Drawing Sheets

ISOLATOR INCLUDING BI-DIRECTIONAL REGULATOR

BACKGROUND

Field of the Invention

This invention relates to isolation technology and more particularly to providing isolation between systems having different voltage domains.

Description of the Related Art

In a typical application, an electromechanical system provides one or more signals for monitoring and/or receives one or more signals for controlling the electromechanical system. During normal operation, a large DC or transient voltage difference may exist between the domain of the electromechanical system and the domain of the monitor or control system, thus requiring an isolation barrier between the electromechanical system and the monitor or control system. For example, one domain may be grounded at a voltage that is switching with respect to earth ground by tens, hundreds, or thousands of volts while the other domain has a 3 V or 5 V voltage swing. Accordingly, an intermediate system includes isolation that prevents damaging currents from flowing between the electromechanical system and the monitor or control system. Although the isolation prevents the electromechanical system from being coupled to the monitor or control system by a direct conduction path, an isolation channel allows communication between the two systems.

Figure 1:
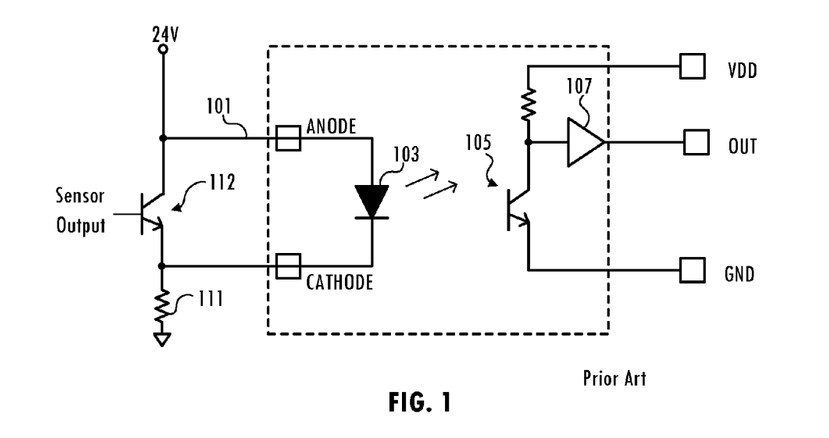
FIG. 1 illustrates a prior art opto-isolator.

Opto-isolation is a technique used to provide the desired isolation. Referring to FIG. 1, an exemplary programmable logic control (PLC) application uses an opto-isolator to provide isolation between the exemplary electromechanical system, which has a voltage domain of 24 V, and driver 107 of a monitor system having a voltage domain of typically 5 V, but may vary, depending on the application. In response to a current being supplied through node 101, light emitting diode (LED) 103 emits light that is received by photo transistor 105, which generates a signal that turns on driver 107. Driver 107 may be coupled to a microcontroller unit of the monitor system.

One shortcoming of the opto-isolators of FIG. 1 is that the output of LED 103 is dependent on the strength of the current through node 101. That is, the stronger the current through node 101, the stronger LED 103 is driven, and the stronger the output of LED 103, which may result in undesirable switching characteristics. In addition, opto-isolators may be susceptible to common mode input transients, requiring an external resistor 111 to overdrive LED 103 to keep LED 103 on when a common mode transient occurs during an output high state. However, the use of external resistor 111 reduces efficiency during operation when the control current is turned off via control transistor 112 due to power dissipation through external resistor 111.

Thus, it would be desirable to provide improved isolation technology with greater immunity to input common mode transients and improved operating efficiency.

SUMMARY OF EMBODIMENTS OF THE INVENTION

In at least one embodiment of the invention, an apparatus includes a first terminal, a second terminal, a bi-directional regulator circuit, and functional circuitry. The bi-directional regulator circuit is configured to generate a voltage across a first power supply node and a second power supply node in response to an input current flowing through the first terminal and the second terminal with a first polarity. The bi-directional regulator circuit is also configured to generate the voltage across the first power supply node and the second power supply node in response to the input current flowing through the first terminal and the second terminal with a second polarity opposite the first polarity. The functional circuitry is powered by the voltage and is configured to generate a signal using the voltage. The signal is indicative of presence of the input current. The bi-directional regulator circuit may include a first circuit coupled between the first terminal and the second terminal. The first circuit may include the first power supply node. The bi-directional regulator circuit may include a second circuit coupled between the first terminal and the second terminal. The second circuit may be coupled in parallel to the first circuit. The second circuit may include the second power supply node. The bi-directional regulator circuit may include a third circuit coupled between the first circuit and the second circuit. The third circuit may be configured to generate the voltage across the first power supply node and the second power supply node. The voltage may have a first polarity in response to the input current having the first polarity and the voltage may have the first polarity in response to the input current having the second polarity.

In at least one embodiment of the invention, a method includes receiving an input current flowing through a first terminal and a second terminal. The input current is one of a first input current having a first polarity and a second input current having a second polarity opposite the first polarity. The method includes generating a voltage across a first power supply node and a second power supply node in response to the input current. The voltage has a first polarity in response to the first input current being received and the voltage has the first polarity in response to the second input current being received. The method includes generating a signal in functional circuitry indicative of presence of the input current using the voltage. The method includes supplying a representation of the signal across a voltage isolation barrier to an isolation link. Generating the voltage across the first power supply node and the second power supply node may include sinking a current from the first terminal to the first power supply node, from the first power supply node to the second power supply node, and from the second power supply node to the second terminal in response to the input current being the first input current. Generating the voltage across the first power supply node and the second power supply node may include sourcing a current from the second terminal to the first power supply node, from the first power supply node to the second power supply node, and from the second power supply node to the first terminal in response to the input current being the second input current.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 2A:
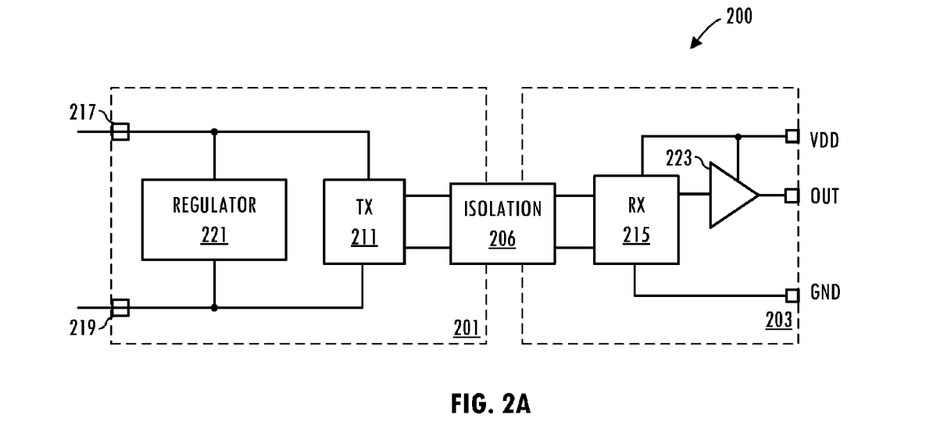
FIG. 2A illustrates an exemplary isolation system.

Referring to FIG. 2A, isolation system 200 is an embodiment of an improved isolator that can be used, e.g., in place of the prior art isolator illustrated in FIG. 1. Isolation system 200 is implemented by providing integrated circuit die 201, integrated circuit die 203, and isolation link 206. Isolation link 206 may be implemented using various techniques and includes an isolation channel that allows communication between a voltage domain on integrated circuit die 203 and a voltage domain on integrated circuit die 206 using capacitive, inductive (transformers), electromagnetic techniques, or a combination thereof. The signals to be transmitted across the isolation channel are generated within the transmit circuitry 211 on one side of the isolation link, and the signals are transmitted between the die using isolation link 206. In general, transmit circuitry 211 drives isolation link 206 with a signal such that energy is transmitted across the isolation link. Transmit circuitry 211 and receive circuitry 215, and in some cases, portions of isolation link 206, are fabricated on integrated circuits utilizing conventional processing techniques, with a high voltage barrier being formed by the separation of the conductive layers with non-conductive material formed therebetween in accordance with conventional processing techniques. In an exemplary embodiment, the high voltage barrier can provide voltage isolation of several thousand volts, e.g., up to around five thousand volts.

Integrated circuit die 201 includes two pins 217 and 219 that correspond to the anode and cathode of the opto-isolator illustrated in FIG. 1. However, rather than rely on a photo-diode, the isolation approach shown in FIG. 2A and described further herein provides improved performance using capacitive, inductive (transformers), electromagnetic techniques, or a combination thereof. However, to be a replacement for prior art isolator implementations such as shown in FIG. 1, where photo-diodes are utilized, there may be no other power available for operation of the transmitter 211 other than power provided using the pins. Accordingly, the embodiment illustrated in FIG. 2A utilizes regulator 221 to generate a voltage (VDD) for use by transmitter circuit 211. When current flows through terminal 217 and terminal 219, regulator 221 sets the voltage VDD, which is used by transmitter 211 to drive a signal into isolation link 206.

Figure 2B:
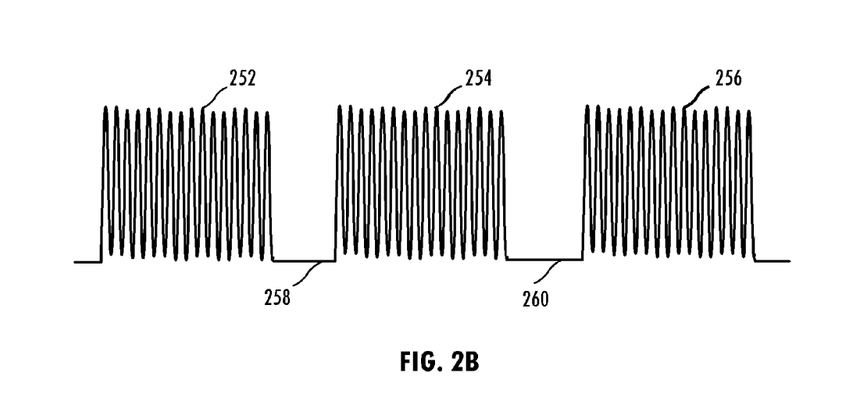
FIG. 2B illustrates an exemplary transmitted signal of the isolation system of FIG. 2A.

In an embodiment, isolation system 200 uses on-off keying (OOK) signaling techniques, i.e., a form of amplitude-shift keying modulation that represents digital data as the presence or absence of a carrier wave or oscillating signal. The presence of the carrier for a particular duration represents a binary one, while its absence for the same duration represents a binary zero. This type of signaling is robust for isolation in driver applications because a logic '0' state sends the same signal (e.g., nothing) as when the primary side loses power and the device gracefully assumes its default state. That behavior is advantageous in driver applications because it will not accidentally turn on a device being driven, even when the primary side loses power. Accordingly, embodiments of transmitter 211 include an oscillator circuit that provides an oscillating signal only when VDD is present, i.e., the only time the oscillating signal is present is when current flows through terminal 217 and terminal 219. An exemplary waveform driven into isolation link 206 is shown in FIG. 2B. As shown by the waveform, the transmitted circuit may be an oscillating signal. When the current flows into the regulator circuit, an oscillator in transmitter 211 generates a waveform at 252, 254, and 256. When no current flows into the regulator, at 258 and 260, no oscillating signal is generated by transmitter 211. Once the signals are received at die 203, receive circuitry 215 detects the transmission from the first die and based on that transmission, turns on the driver 223, which may be coupled to a microcontroller unit or other circuitry.

Figure 2C:
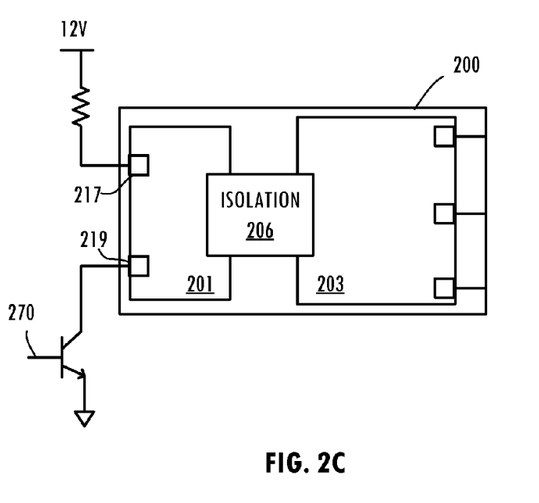
FIG. 2C illustrates a high level diagram of the isolation system of FIG. 2A.

FIG. 2C illustrates a high level diagram of an exemplary isolator application. As can be seen, the isolator system provides a signal (e.g., a sensor output signal or an output control signal in a PLC application) on node 270 to control the current. Note that when the control signal is off, no current flows, making the implementation power efficient.

Figure 3:
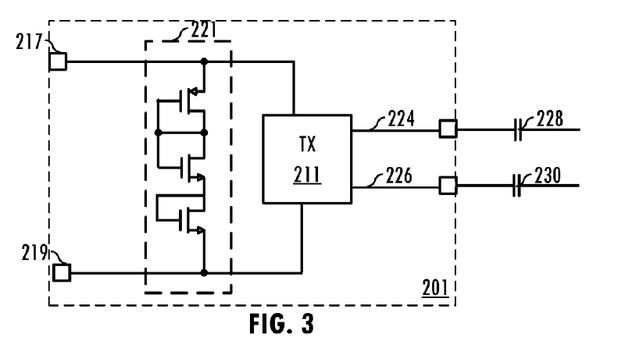
FIG. 3 illustrates an embodiment of the isolation system of FIG. 2A including an exemplary shunt regulator.
Figure 4:
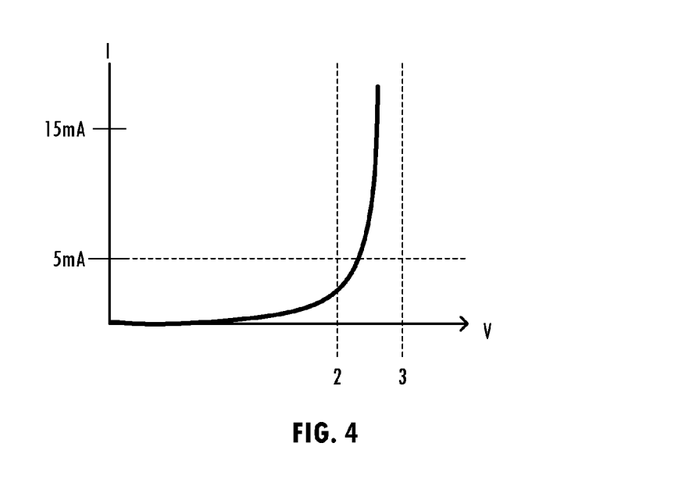
FIG. 4 illustrates a curve illustrating an exemplary current/voltage relationships for the regulator of FIGS. 2A and 2B.

FIG. 3 illustrates an exemplary regulator circuit 221 including diode-connected metal-oxide-semiconductor (MOS) transistor devices. As shown by the graph in FIG. 4, the voltage is relatively stable (e.g., ranges between approximately 2 volts and approximately 3 volts) over a relatively large swing of current flowing through terminals 217 and 219. For example, in an embodiment, the voltage provided by the regulator 221 for an input current of approximately 5 mA is approximately 2.2 volts and the voltage at approximately 15 mA is approximately 2.6 volts. In the embodiment illustrated in FIGS. 2A and 3, no other voltage supply, apart from VDD provided by regulator 221, is used to power the circuitry of transmitter 211. Note that the graph shown is exemplary and such factors as the specific requirements of the system, process technology, and available input current will determine appropriate design parameters for the regulator. Whenever the input current is present, regulator 221 provides VDD to transmitter 211, which drives a signal onto transmission lines 224 and 226, which are coupled to capacitors 228 and 230, respectively, of isolator 206. By providing regulator circuit 221, a replacement for the photodiode approach over the prior art may be provided.

Figure 5:
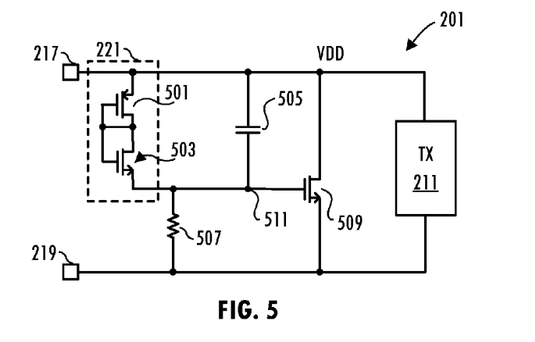
FIG. 5 illustrates an embodiment of an isolation system in which the regulator and electro-static discharge protection circuitry are included.

Another design goal for isolation systems is to provide a circuit that is resistant to electrostatic discharge (ESD). As is known in the art, ESD, which can be several thousand volts, can lead to damage of electronic components. Accordingly, it is desirable to provide protection circuits on input terminals that make the device resistant to ESD effects. Referring to FIG. 5, an embodiment of integrated circuit 201 includes combined ESD protection and regulation. Regulator 221 includes diode-connected devices 501 and 503 between the input terminal and the node 511. In addition, capacitor 505 and resistor 507 function to provide ESD protection on input terminal 217. Transistor 509, preferably a large device, turns on and sinks excess current if the voltage on node 511 gets too high. Combining the regulation and ESD functions can be advantageous. For example, the presence of diodes 501 and 503 allow resistor 507 to be much smaller than in traditional ESD circuits, e.g., the size of resistor 507 can be on the order of 1K ohm, instead of 300K ohms that may be required absent the diodes. In addition, a wider current range may be achieved with a voltage range of 2.2 to 2.6 volts. For example, a regulator combined with ESD in the manner described herein can accommodate a current range of approximately 4 mA to approximately 50 mA. At 4 mA, less power is consumed (as compared to, e.g., 5 mA), while an upper range of approximately 50 mA allows for a wider working current range as compared to, e.g., an upper range limit of 15 mA. Note that the regulator and ESD circuits of FIG. 5 are exemplary only and other circuit implementations may be used.

Referring back to FIGS. 1 and 2A, in a typical PLC application illustrated, the isolation system is configured to sink current received from the external power supply node using terminal 217 to the external ground node through LED 103 and terminal 219 and the isolation system generates a positive voltage across the anode and cathode. Similarly, regulator 221 of FIG. 2A sinks current received from using terminal 217 and out through terminal 219 to ground to generate a positive VDD for transmitter 211. However, in other typical PLC applications, the anode and cathode terminals are programmable and the voltage drop across those same terminals is a negative voltage. Accordingly, in those applications, the isolation system is expected to source current from a power supply terminal coupled to the cathode (or terminal 219) and drive the current out the anode (or terminal 217) to a sensor switch. However, application of a negative voltage across the anode and cathode of LED 103, reverse-biases LED 103 and effectively disables it. Similarly, regulator 221 of FIG. 2A is effectively disabled in response to a negative voltage applied to input terminals 217 and 219. Rather than use separate isolator designs for different programmable logic control (PLC) applications, a PLC isolator that supports both terminal configurations, e.g., supports the capability to source current through terminal 217 and the capability to sink current through the terminal to ground or other power supply node, is desirable.

Figure 6A:
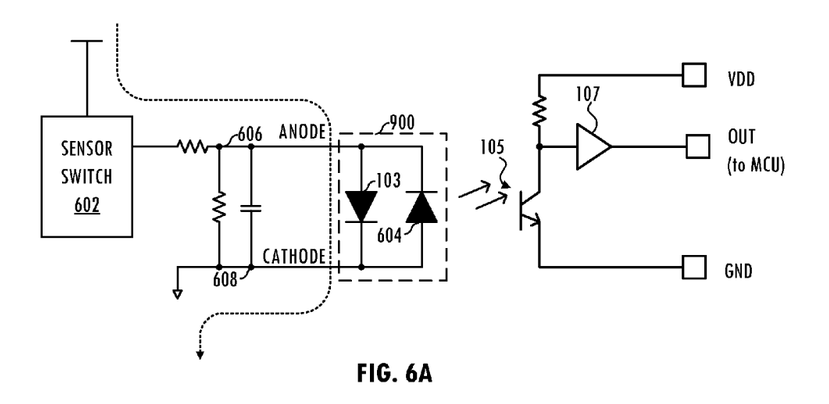
FIG. 6A illustrates an exemplary isolator circuit configured to sink current from a high-voltage system.
Figure 6B:
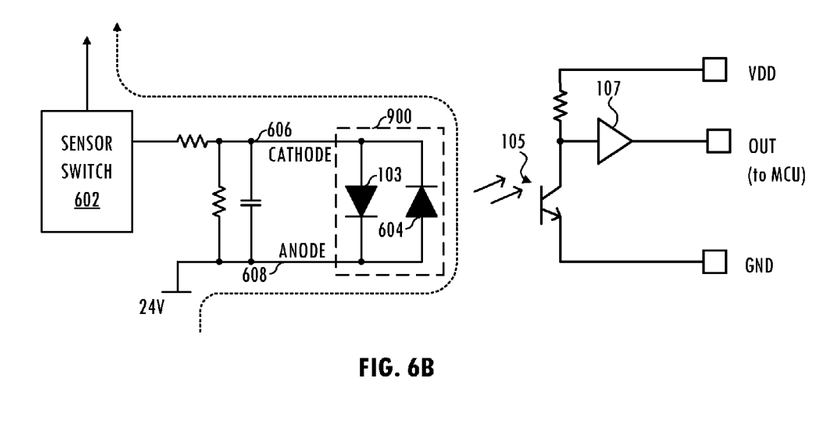
FIG. 6B illustrates an exemplary isolator circuit configured to source current to the high-voltage system.

FIGS. 6A and 6B illustrate an exemplary opto-isolator in which the positive and negative power supply terminals are programmable according to a sensor or switch coupled provide a signal to the isolator device. Accordingly, LED 103 and LED 604 are coupled back-to-back to provide a single-channel, opto-isolator that is capable of sinking current from sensor switch 602 in response to a positive voltage drop across terminal 606 and terminal 608 and is also capable of sourcing current from a power supply node and driving it to sensor switch 602 in response to a negative voltage drop across terminal 606 and terminal 608. In operation, when LED 103 is forward-biased and conducting current in the presence of a positive input current (i.e., a positive voltage drop across node 606 and 608), LED 604 is reverse-biased and effectively disabled. Similarly, when LED 604 is forward-biased and conducting current in the presence of a negative input current (i.e., a negative voltage drop across node 606 and node 608), LED 103 is reverse-biased and is effectively disabled. However, similar to the opto-isolator of FIG. 1, the outputs of LED 103 and LED 604 are dependent on the strength of the current through node 606 and the current through node 608, respectively. That is, the stronger the current through node 606 or node 608, the stronger LED 103 or LED 604 is driven, respectively, and the stronger the output of LED 103 or LED 604, respectively, which may result in undesirable switching characteristics. The opto-isolator may also be susceptible to common mode input transients, requiring external resistors to overdrive LED 103 and LED 604 when a common mode transient occurs during an output high state. The use of external resistors may reduce efficiency during operation when the control current is turned off due to power dissipation through those external resistors. In addition, LED 103 and 106 require manufacture in a custom manufacturing process that provides a limited feature set. Those LEDs are discrete devices that consume substantial board area, incur placement costs, and restrict choice of microcontroller units that may be used in a target PLC application.

Accordingly, a CMOS isolation technique emulates the back-to-back diodes to generate a voltage for use as VDD by transmitter 211 in response to either a positive or negative voltage across the input terminals of an integrated circuit. The technique is capable of generating VDD in response to a current flowing in either direction, i.e., when a positive or negative current flows through terminal 217 and terminal 219. The embodiment can be manufactured using a typical 5V process (e.g., a 5V deep n-well process) instead of a 36V bipolar CMOS diode process, thereby facilitating integration of additional features in typical CMOS logic on the integrated circuit.

Figure 7:
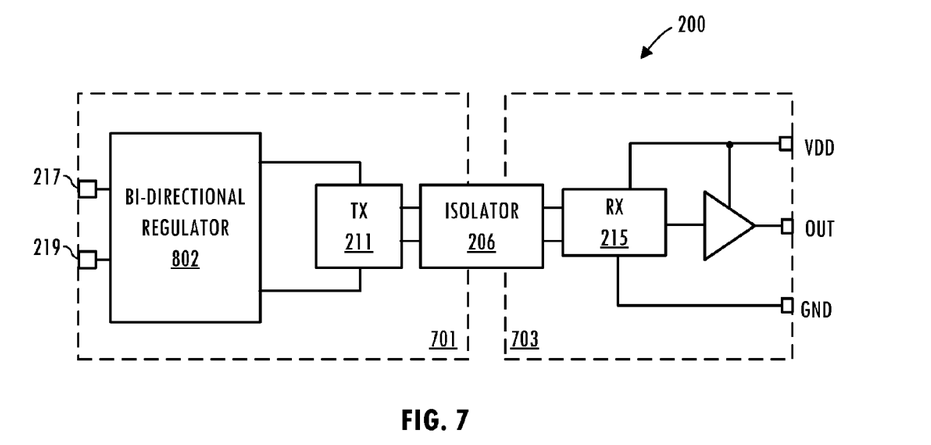
FIG. 7 illustrates an exemplary isolation system including a bi-directional regulator consistent with at least one embodiment of the invention.
Figure 8:
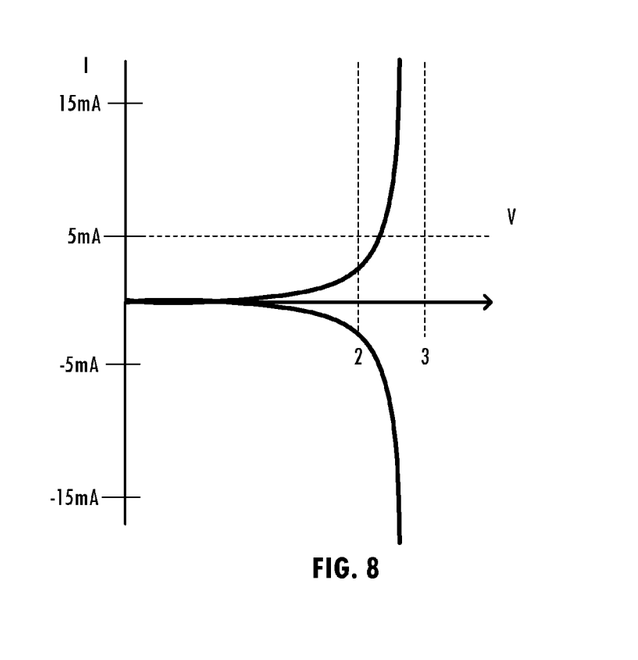
FIG. 8 illustrates a curve illustrating an exemplary current/voltage relationships for a bi-directional regulator of FIG. 7.

Referring to FIG. 7. an embodiment of isolation system 200 includes bi-directional regulator 802, which provides power to transmitter 211 in response to a current flowing into bi-directional regulator 802 through terminal 217 (i.e., sourcing the current through terminal 217 from external to integrated circuit die 701 and sinking the current through terminal 219 to a ground node external to integrated circuit die 701) and also provides power to transmitter 211 in response to a current flowing into bi-directional regulator 802 through terminal 219 (i.e., sourcing the current through terminal 219 from a power supply external to integrated circuit die 701 and sinking the current through terminal 217 to a sensor or other circuit external to integrated circuit die 701). Transmitter 211 receives VDD, which indicates the presence or absence of a current through terminal 217 from bi-directional regulator 802 and drives a signal into isolation link 206 using OOK techniques described above, or other suitable techniques. As shown in FIG. 8, the voltage is relatively stable over a relatively large swing of current through terminal 217 for currents of either direction (i.e., either polarity).

Figure 9:
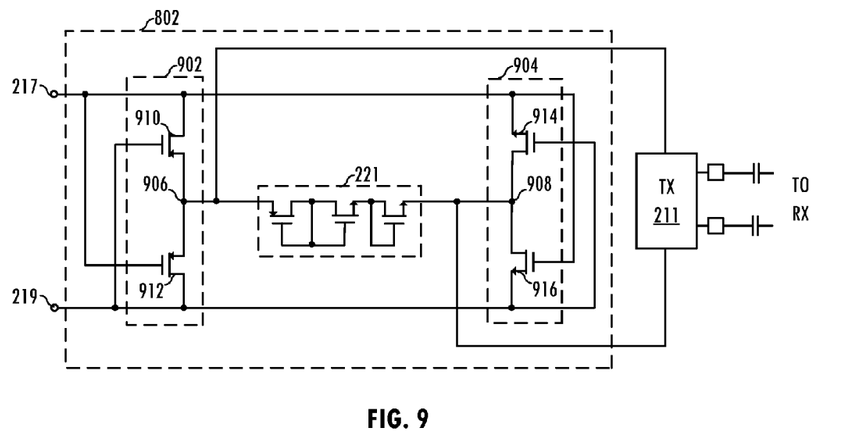
FIG. 9 illustrates an exemplary bi-directional regulator consistent with at least one embodiment of the invention.

Referring to FIG. 9, an embodiment of bi-directional regulator 802 includes regulator 221 coupled in a relatively low voltage drop bridge circuit. Regulator circuit 221 is coupled as a bridge circuit between node 906 of circuit 902 and node 908 of circuit 904. In an embodiment, circuit 902 includes p-type devices coupled between terminal 217 and terminal 219. Node 906, which is between the p-type devices of circuit 902 is coupled to regulator 221. In an embodiment, circuit 904 includes n-type devices coupled between terminal 217 and terminal 219. Node 908, which is between the n-type devices of circuit 904, is coupled to regulator 221. When an input current is present and the voltage across terminal 217 and terminal 219 is such that $V_{217}$-$V_{219}$ has a first polarity (e.g., positive), p-type device 910 is enabled and p-type device 912 is disabled. Thus, current flows through regulator 221 from node 906 to node 908, which are the power supply nodes for transmitter 211. N-type device 914 is disabled and n-type device 916 is enabled to drive current from node 908 out through terminal 219 and a positive VDD is generated across node 906 and node 908. When an input current is present and the voltage across terminal 217 and terminal 219 is such that $V_{217}$-$V_{219}$ has a second polarity (e.g., negative), p-type device 910 is disabled and p-type device 912 is enabled, current flows through regulator 221 from node 906 to node 908, n-type device 914 is enabled and n-type device 916 is disabled, thereby sourcing current from node 219 and driving current out through terminal 217, and generating a positive voltage across node 906 and node 908, which are the power supply nodes for transmitter 211.

Note that in other embodiments, circuits 902 and 904 include additional devices. For example, devices 910 and 912 may each comprise multiple p-type devices coupled in parallel. Likewise, devices 914 and 916 may each comprise multiple n-type devices coupled in parallel. In addition, unlike traditional voltage rectification techniques, in bi-directional regulator 802, only a gate-to-source voltage greater than a threshold voltage ($V_{GS}$>$V_T$) is required to enable devices 910, 912, 914, and 916, and there is no need to drop voltage across the sources and drains of devices 910, 912, 914, and 916. Thus, by choosing relatively large sizes for devices 910, 912, 914, and 916, the voltage drop due to enabled devices of devices 910, 912, 914, and 916 is relatively small and has a negligible effect on the power supply level provided by bi-directional regulator 802 across nodes 906 and 908 to power other circuitry (e.g., transmitter 211).

In addition, ESD features, consistent with teachings above, may be incorporated with bi-directional regulator 802. In at least one embodiment of bi-directional regulator 802, circuits 902 and 904 include resistors for ESD purposes. Those resistors may be included in series with devices 910, 912, 914, and 916 and/or between substrate terminals (not shown) of devices 910 and 912 and node 906 and/or between substrate terminals (not shown) of devices 914 and 916 and node 908. Exemplary resistor values are relatively small to reduce power dissipation. For example, resistors in the current-carrying path may have values on the order of ten ohms and resistors coupled to the bulk terminals may have values on the order of one kilo-ohm.

Figure 10:
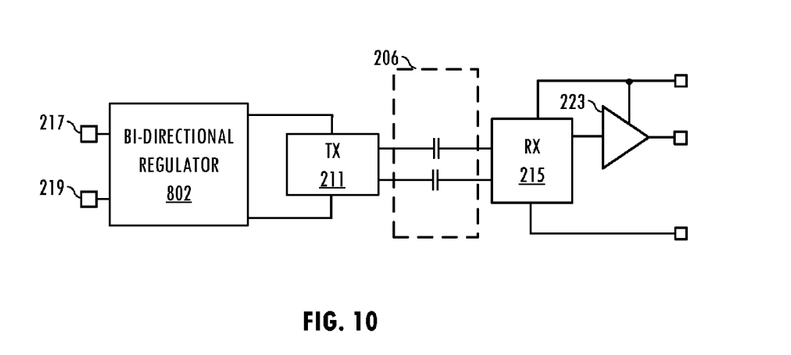
FIG. 10 illustrates an exemplary isolation system including a bi-directional regulator and capacitive isolation consistent with at least one embodiment of the invention.

Referring to FIG. 10, in at least one embodiment of the isolation system, isolation link 206 uses capacitive isolation. Differential signaling provides improved performance in the presence of common mode interference. Additional details on differential embodiments can be found in the U.S. patent application Ser. No. 11/020,977 entitled "RF Isolator with Differential Input/Output," naming Timothy Dupuis as inventor, filed Dec. 22, 2004, published on Dec. 8, 2005 as U.S. Patent Application Publication No. 2005/0271148, which application is incorporated herein by reference in its entirety.

Figure 11:
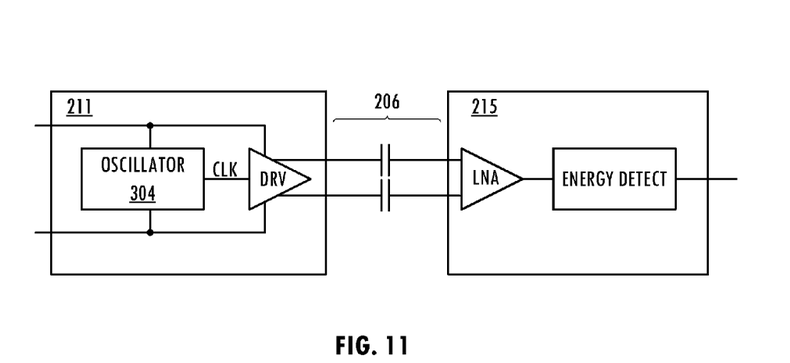
FIG. 11 illustrates exemplary transmitter and receiver circuits for the system of FIG. 7 consistent with at least one embodiment of the invention.

Referring to FIG. 11, in at least one embodiment of isolation system 200, an exemplary transmitter 211 generates a representation of the signal to be communicated over the isolation channel by starting and stopping oscillator 304 using the power supply nodes as the enabling signal. The resulting signal, CLK, is used as the representation of the signal indicative of the presence or absence of current (e.g., signal of FIG. 2B) and that is transmitted across isolation channel 206. An exemplary receiver 215 includes a low-noise amplifier, energy detector, and/or other suitable receiver circuitry to receive and recover data from the signal transmitted across isolation channel 206. In embodiments in which an oscillating signal is transmitted, any circuit that can detect the presence of an oscillating signal can be used in receiver 215.

Figure 12:
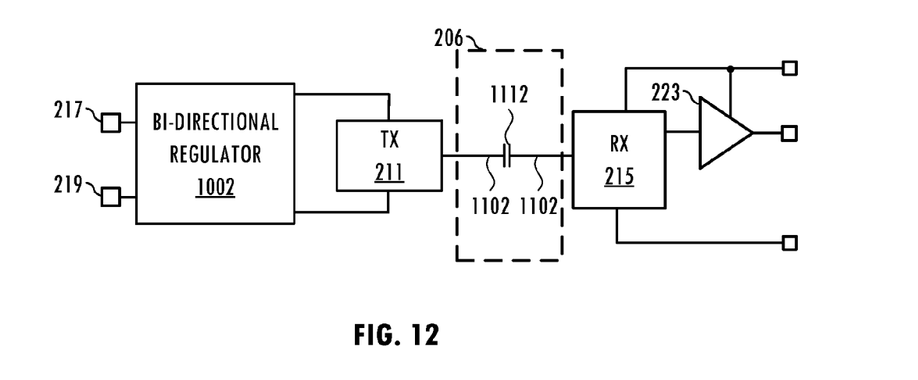
FIG. 12 illustrates an exemplary single-ended embodiment of a capacitive isolation system including a bi-directional regulator consistent with at least one embodiment of the invention.

While the differential isolation link shown in, e.g., FIG. 9, provides improved performance in the presence of common mode interference, other embodiments utilize single-ended inputs and outputs that may be suitable for some applications. Referring to FIG. 12, a single-ended approach to isolation isolates transmitter 211 from receiver 215 on opposite sides of link 1102 using capacitor 1112.

Use of the isolation techniques described above allows the isolator to provide switching characteristics that are substantially independent of the strength or direction of the current. While capacitive isolation techniques described above may be used in various embodiments of the invention, the invention is not restricted to those particular isolation techniques. In fact, many different isolation techniques may utilize the bi-directional regulator approach and the regulator/ESD approach described herein. Thus, while one isolation technique may use the capacitive isolation techniques shown, many other isolation approaches are possible that use a bi-directional regulator to provide a voltage to a driver or transmitter circuit to generate a signal that can be coupled to the other side of an isolation barrier.

Figure 13:
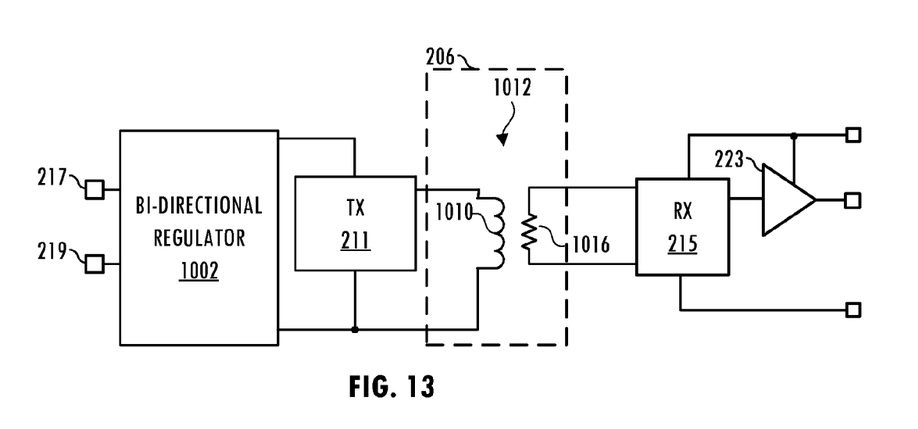
FIG. 13 illustrates an exemplary embodiment of the isolation system including a bi-directional regulator and using a magneto-resistive coupler for isolation consistent with at least one embodiment of the invention.

Referring now to FIG. 13, another isolation approach makes use of a magneto-resistive coupler. Magneto-resistive coupler 1012 includes resistor 1016 and associated transformer 1010. Resistor 1016 has a resistance value that changes responsive to the magnetic flux about resistor 1016. In an embodiment, receiver 215 utilizes a Wheatstone bridge to detect the magnetic flux of the resistor and determine transmitted data.

Figure 14:
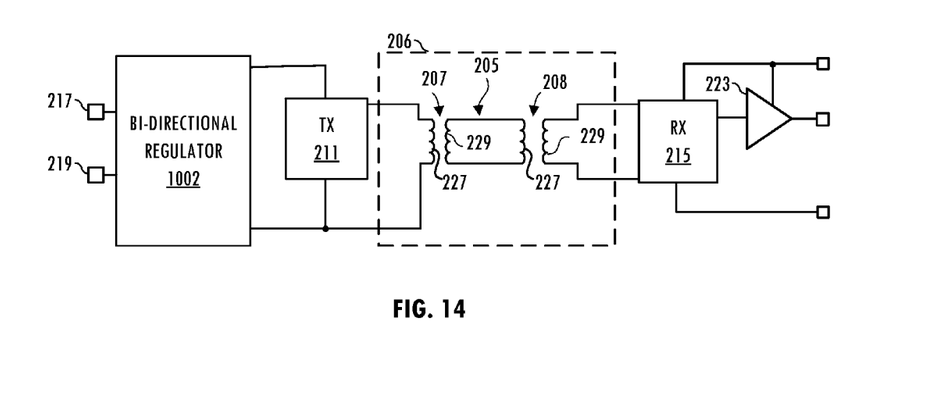
FIG. 14 illustrates an exemplary embodiment of the isolation system including a bi-directional regulator and using a transformer for isolation consistent with at least one embodiment of the invention.

Referring to FIG. 14, in at least one embodiment, isolation channel 206 includes transformer 207 coupled to transmitter 211 and transformer 208 coupled to receiver 215. The signals to be transmitted are generated within transmitter 211 on one side of the isolation link, and the signals are transmitted between the die utilizing the transformers 207 and 208 in each die and the magnetic coupling effect therebetween. In particular, transmit circuitry 211 drives transformer 207 with a signal such that energy is coupled from primary coil 227 to secondary coil 229. That allows energy to be transmitted on transmission lines 205 that couple transformers 207 and 208 together.

Figure 15:
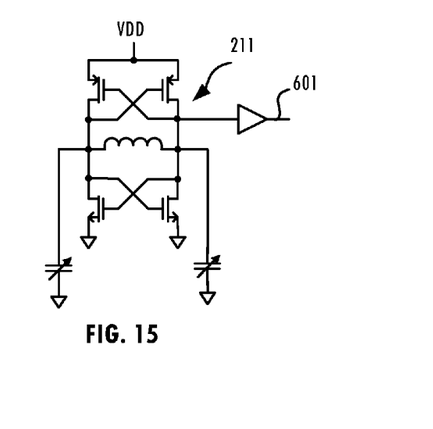
FIG. 15 illustrates an exemplary oscillator that may be utilized for the transmitter of FIG. 14.

Referring to FIG. 15, an exemplary oscillator circuit is shown that may be used to form the transmitter circuit of FIG. 5. When the regulator supplies a voltage for transmitter, an oscillation signal 601 is driven to isolation channel 206.

In an exemplary embodiment, a 2 GHz oscillator is utilized. Other types of oscillators and other oscillation frequencies may, of course, be utilized.

Figure 16:
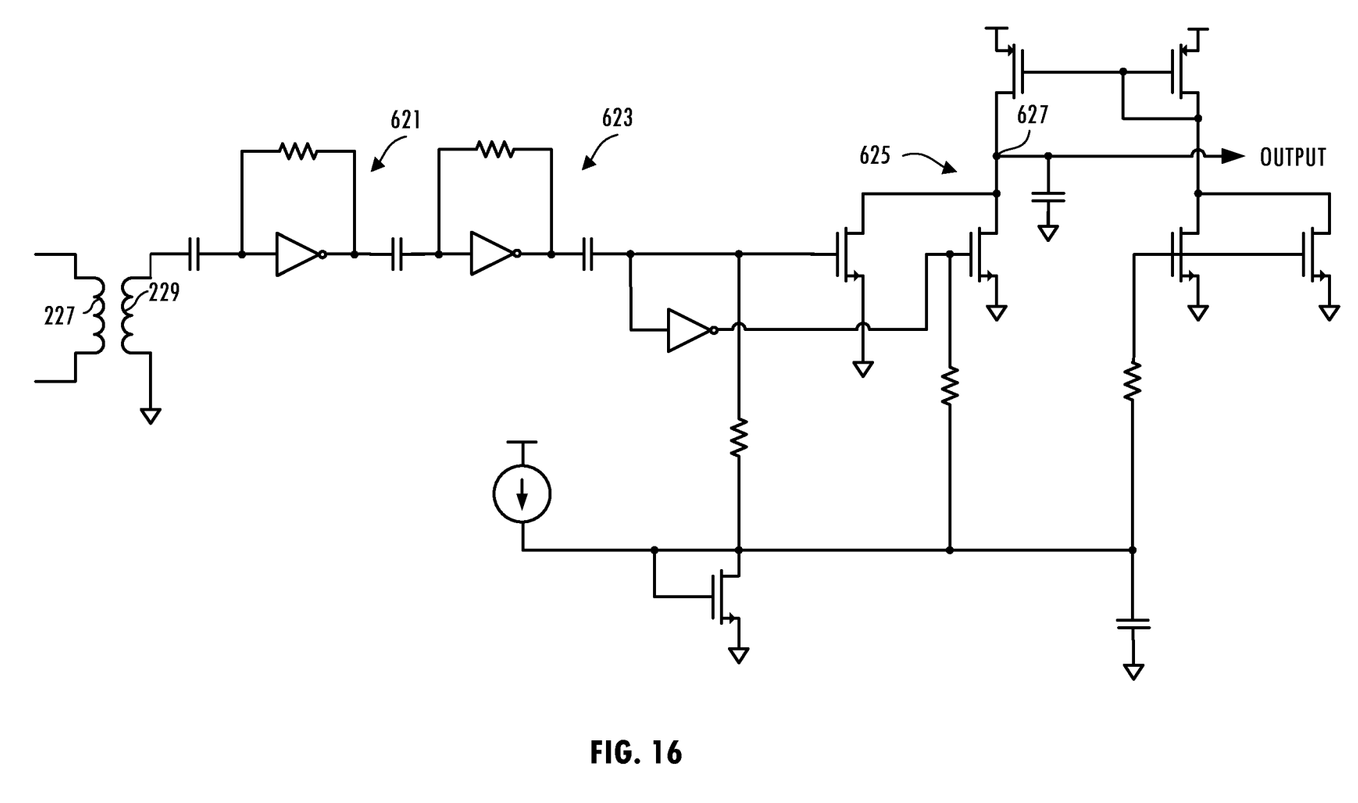
FIG. 16 illustrates a high level diagram of a receive circuit that may be utilized in the isolation system of FIG. 14.

Referring to FIG. 16, an exemplary receiver circuit includes amplifier stages 621 and 623 and detector circuit 625 that detects the presence of the oscillating signal and provides an output at node 627 equal to VDD in the absence of the oscillating signal and a low voltage when the oscillating signal is present. Of course, many other receiver circuits may be implemented, depending upon the nature of the transmitted signal and specific system requirements. Additional description of the isolator is described in U.S. patent application Ser. No. 12/129,039, filed on May 29, 2008, entitled "Isolator Circuit Including a Voltage Regulator," naming Donald E. Alfano, et al. as inventors, and U.S. Provisional Application No. 60/946,064, filed Jun. 25, 2007, entitled "Isolator Circuit Including a Voltage Regulator," and naming as inventors Donald E. Alfano, Timothy J. Dupuis, Zhiwei Dong, and Brett E. Etter, which applications are incorporated by reference herein. Additional description of various transmit and receive circuits that may be used in various embodiments of the invention are provided in the applications, "On Chip Transformer Isolator," filed Jun. 3, 2004, U.S. patent application Ser. No. 10/860,519, U.S. Patent Application Publication No. 2005/0269657, naming Timothy Dupuis as inventor; and "RF Isolator with Differential Input/Output," U.S. patent application Ser. No. 11/020,977, naming Timothy Dupuis as inventor, filed Dec. 22, 2004, published on Dec. 8, 2005 as U.S. Patent Application Publication No. 2005/0271148 A1, which applications are incorporated herein by reference in their entirety.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and non-transitory computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in embodiments of a PLC application, one of skill in the art will appreciate that the teachings herein can be utilized for other isolation applications. Variations and modifications of the embodiments disclosed herein, may be made based on the description set forth herein, without departing from the scope and spirit of the invention as set forth in the following claims.

What is claimed is:

1. An apparatus comprising:
    a first terminal;
    a second terminal;
    a bi-directional regulator circuit configured to generate a voltage across a first power supply node and a second power supply node in response to an input current flowing through the first terminal into the bi-directional regulator circuit and from the bi-directional regulator circuit through the second terminal with a first polarity and configured to generate the voltage across the first power supply node and the second power supply node in response to the input current flowing through the second terminal into the bi-directional regulator circuit and from the bi-directional regulator circuit through the first terminal with a second polarity opposite the first polarity; and
    functional circuitry, powered by the voltage and configured to generate a signal using the voltage, the signal being indicative of presence of the input current.

2. The apparatus, as recited in claim 1, wherein the bi-directional regulator circuit comprises:
    a first circuit coupled between the first terminal and the second terminal, the first circuit comprising the first power supply node;
    a second circuit coupled between the first terminal and the second terminal, the second circuit being coupled in parallel to the first circuit, the second circuit comprising the second power supply node; and
    a third circuit coupled between the first circuit and the second circuit, the third circuit being configured to generate the voltage across the first power supply node and the second power supply node, the voltage having a first voltage polarity in response to the input current having the first voltage polarity and the voltage having the first polarity in response to the input current having the second polarity.

3. The apparatus, as recited in claim 2, wherein the first circuit comprises a first device of a first type coupled between the first terminal and the first power supply node and a second device of the first type coupled between the first power supply node and the second terminal.

4. The apparatus, as recited in claim 3, wherein the second circuit comprises a third device of a second type coupled between the first terminal and the second power supply node and a fourth device of the second type coupled between the second power supply node and the second terminal.

5. The apparatus, as recited in claim 2, wherein the first circuit is a p-type transistor circuit and the second circuit is an n-type transistor circuit.

6. The apparatus, as recited in claim 2, wherein the third circuit comprises a regulator circuit.

7. The apparatus, as recited in claim 6, wherein when no input current is supplied to the apparatus, substantially zero voltage is generated by the regulator circuit and the signal is not supplied by the functional circuitry.

8. The apparatus, as recited in claim 2, further comprising:
    an isolation circuit responsive to the signal to supply a representation of the signal across an isolation barrier to an isolation link.

9. The apparatus, as recited in claim 8, wherein the input current is indicative of a control signal for a driver circuit electrically isolated from the input current by at least the isolation barrier.

10. The apparatus, as recited in claim 8, further comprising:
    a first unit comprising the first circuit, the second circuit, the third circuit, the functional circuitry, and the isolation circuit; and
    a second unit comprising a receiver circuit and a high voltage driver circuit,
    wherein the first unit and the second unit are coupled by the isolation link, wherein the representation of the signal is provided to the second unit over the isolation link, the representation of the signal being indicative of a control signal for the high voltage driver circuit.

11. The apparatus, as recited in claim 1, wherein the functional circuitry is coupled such that the voltage is the only voltage supplied to power the functional circuitry.

12. The apparatus, as recited in claim 1, wherein a voltage drop across the first terminal and the first power supply node is negligible and a second voltage drop across the second power supply node and the second terminal is negligible.

13. A method comprising:
receiving an input current flowing through a first terminal and a second terminal, the input current being one of a first input current having a first polarity and a second input current having a second polarity opposite the first polarity;
generating a voltage across a first power supply node and a second power supply node in response to the input current, the voltage having a first voltage polarity in response to the first input current being received and the voltage having the first voltage polarity in response to the second input current being received;
generating a signal in functional circuitry indicative of presence of the input current using the voltage; and
supplying a representation of the signal across a voltage isolation barrier to an isolation link.

14. The method, as recited in claim 13, wherein supplying the representation of the signal across the voltage isolation barrier comprises supplying the signal to a capacitor, the capacitor implementing the voltage isolation barrier.

15. The method, as recited in claim 13, further comprising:
electrically isolating the functional circuitry from a receiver circuit coupled to a high voltage driver circuit using a capacitor to capacitively couple the functional circuitry to the receiver circuit.

16. The method, as recited in claim 13, further comprising:
transmitting the representation of the signal over the isolation link to a receiver circuit coupled to a high voltage driver circuit that is electrically isolated from the input current; and
generating a control signal for the high voltage driver circuit using the representation of the signal.

17. The method, as recited in claim 13, wherein generating the voltage across the first power supply node and the second power supply node comprises:

sinking a current, the sinking being from the first terminal to the first power supply node, from the first power supply node to the second power supply node, and from the second power supply node to the second terminal in response to the input current being the first input current; and
sourcing a current from the second terminal to the first power supply node, from the first power supply node to the second power supply node, and from the second power supply node to the first terminal in response to the input current being the second input current.

18. The method, as recited in claim 13, wherein the receiving comprises:
sourcing the input current from a terminal, the terminal being the first terminal when the input current is the first input current and the terminal being the second terminal when the input current is the second input current.

19. The method, as recited in claim 13, wherein a voltage drop across the first terminal and the first power supply node is negligible and a second voltage drop across the second power supply node and the second terminal is negligible.

20. An apparatus comprising:
means for receiving an input current flowing through a first terminal and a second terminal, the input current being one of a first input current having a first polarity and a second input current having a second polarity opposite the first polarity;
means for generating a voltage across a first power supply node and a second power supply node in response to the input current, the voltage being one of a first voltage having a first voltage polarity in response to the first input current being received and a second voltage having the first voltage polarity in response to the second input current being received;
means for generating a signal in functional circuitry indicative of presence of the input current using the voltage; and
means for supplying a representation of the signal across a voltage isolation barrier to an isolation link.

21. The apparatus, as recited in claim 20, wherein the means for receiving provides the input current to the means for generating the voltage using one of the first terminal and the second terminal and the means for generating the voltage provides the input current to another of the first terminal and the second terminal.

* * * * *

UNITED STATES PATENT AND TRADEMARK OFFICE
CERTIFICATE OF CORRECTION

PATENT NO. : 9,537,581 B2
APPLICATION NO. : 14/319601
DATED : January 3, 2017
INVENTOR(S) : Michael J. Mills et al.

It is certified that error appears in the above-identified patent and that said Letters Patent is hereby corrected as shown below:

In the Claims

In Column 10, Line 29, please delete "voltage" after "first";
In Column 10, Line 30, please insert --voltage-- after "first".

Signed and Sealed this
Twenty-eighth Day of February, 2017

Michelle K. Lee
*Director of the United States Patent and Trademark Office*